June 21, 1927.
C. SMITH
1,633,233
LOCK FOR GAS STOVE VALVES AND OTHER VALVES
Filed Jan. 28, 1926
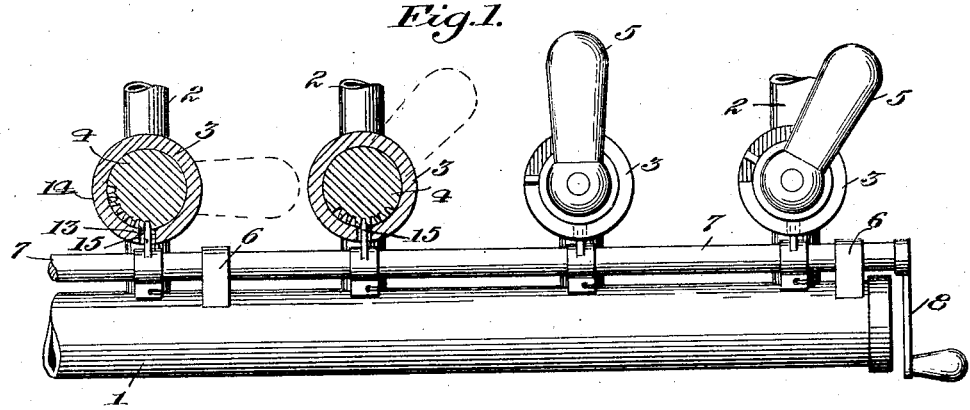
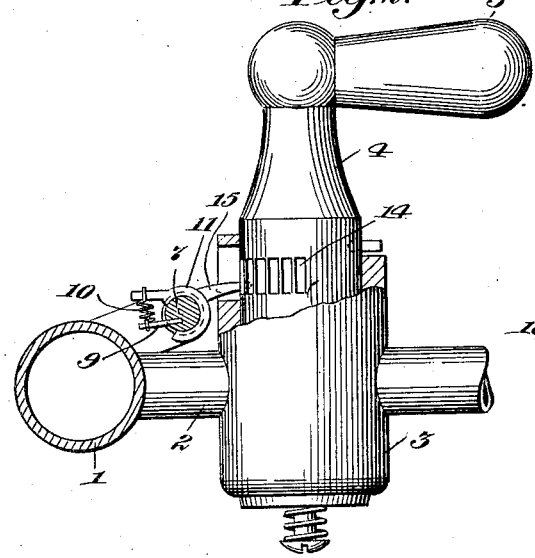
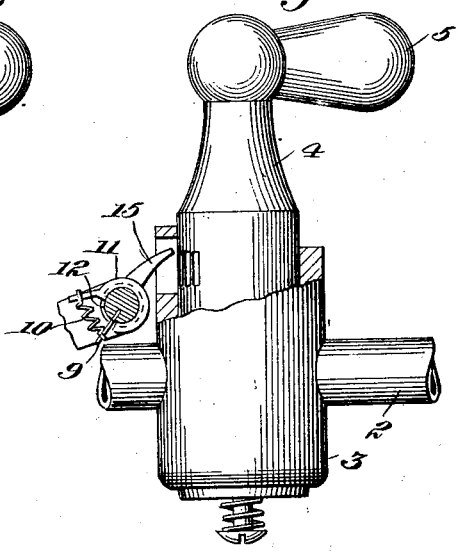
Inventor:
Calvin Smith,
Att'y.

Patented June 21, 1927.

1,633,233

UNITED STATES PATENT OFFICE.

CALVIN SMITH, OF SOMERVILLE, NEW JERSEY.

LOCK FOR GAS-STOVE VALVES AND OTHER VALVES.

Application filed January 28, 1926. Serial No. 84,369.

This invention relates to a lock for valves of the rotary type, and is particularly well adapted for use on gas stove valves, but may be applied for use with other valves.

One object of the invention is to provide a valve of the type above specified that is of simple construction, practical in operation, and one having a minimum of parts.

Another object of the invention is to provide a valve lock which will lock a multiplicity of valves by a single operation.

Another object of the invention is to provide a valve lock which will unlock a multiplicity of valves by a single operation.

Another object of the invention is to provide a valve lock that will lock a plurality of valves in whatever position they happen to be in when the lock is turned to locked position.

Other objects of the invention will appear hereinafter throughout the specification.

Referring to the drawings,—

Figure 1 is a plan view of my invention, partly in section, mounted on a gas stove;

Figure 2 is an enlarged view, partly in section, of one of the valves shown in Figure 1 in locked position; and Figure 3 is a plan view of the valve shown in Figure 2 in unlocked position.

More specifically, 1 indicates the manifold of a cooking gas stove of the kind ordinarily used in houses. This manifold is connected by suitable connections with a source of supply outside of the house. Connected to the gas manifold 1 are a number of branches 2 leading to the various burners of the stove. Numeral 3 indicates a number of valve members which control the supply of gas to the individual gas burners. Each valve 3 has a rotary plug 4 which is provided with a handle 5 for rotating the plug to open or close the valve.

Mounted on the manifold 1 are a number of bearings 6 for supporting a rotary shaft 7 having an operating handle 8 for turning the said shaft. Opposite each valve member there is mounted in the rotary shaft 7 a pin 9. The numeral 10 indicates a tension spring having one of its ends attached to the pin 9 and its other end attached to a latch member 11 which is mounted on the shaft 7 in a groove 12 for free rotation on said shaft 7. Each valve 3 is provided with a cut-out portion 13. Each plug member 4 is provided with a series of holes preferably rectangular in shape, as shown in Fig. 2.

The locking or latching members 11 have fingers 15 which are adapted to enter the rectangular holes 14 of the valve plugs 4 to lock the same in any one of a plurality of positions.

The operation is as follows:—

If it be desired to lock the valves of the stove in the positions illustrated, for instance, in Fig. 1, the handle 8 is operated to rotate the shaft 7 in what would be a clockwise direction of the shaft when viewed from the right hand end of said shaft, or as shown in Figs. 2 and 3. When the shaft 7 is rotated all of the springs 10 are compressed by the pins 9, which force the latch members 11 to rotate to the position indicated in Fig. 2, the fingers 15 of said latch members having entered the rectangular holes of the valve plugs 4. In this position all of the valve plugs 4 are locked in their positions. If it now be desired to unlock one of the valve plugs without unlocking any of the other plugs, such unlocking may be accomplished by rotating the locking member counter-clockwise (Fig. 2) by pressing with the fingers on the said locking member until the finger 15 has cleared the rectangular hole 14. After the valve has been opened or closed, by merely releasing the latch member 11, its finger 15 will be forced by the spring 10 to engage and lock the valve in its new position.

When it is desired to unlock all the valves simultaneously, the handle 8 is turned in the opposite direction (counter-clockwise as viewed from the right hand end of shaft 7, Fig. 1). The springs 10 become tension springs and exert their tension on the latch members 11 to lift them clear of the holes 14 and the valves are free to be turned in either direction. In either locked or unlocked position, the weight of the shaft 7 and the friction in its bearings 6 is such that it cannot be turned by the tension of the springs 10.

In practice there can be no accidental opening or closing of the valves such as might happen by brushing against them accidentally, or by children attempting to open them in play.

It is to be expressly understood that the drawings and description are intended to be merely an illustration of my invention, and that I desire to limit my invention only to the extent indicated by the appended claims.

What I claim is:—

1. A lock for gas stove valves comprising a rotary shaft, means for operating said shaft, a plurality of valves, and a plurality of members mounted on said shaft for independent movement on said shaft for locking said valves.

2. A lock for gas stove valves comprising a rotary shaft, a plurality of valves, a plurality of pins mounted on said shaft, and means operated by said pins for locking said valves.

3. A lock for valves comprising a plurality of valves, a rotary shaft, and a plurality of members mounted on said shaft for independent movement on said shaft for simultaneously locking all of said valves.

4. A lock for valves comprising a plurality of valves, and means for simultaneously locking all of said valves in any position.

5. A lock for gas stove valves comprising a plurality of valves, each having a rotary plug provided with holes, a rotary shaft, means for turning said shaft, a plurality of pins mounted on said shaft, a plurality of latch members freely rotatable on said shaft, springs attached to said pins and said latches whereby when said shaft is rotated said latches may be caused to engage said holes in said valve plugs to prevent rotation or disengaged to allow rotation of said valve plugs.

6. A lock for valves comprising a plurality of valves, means for locking said valves in any position, and means for simultaneously unlocking all of said valves.

In testimony whereof I affix my signature.

CALVIN SMITH.